(12) United States Patent
Albasateneh

(10) Patent No.: US 6,257,817 B1
(45) Date of Patent: Jul. 10, 2001

(54) PNEUMATIC BAR FEEDING APPARATUS FOR FEEDING A LENGTH OF BAR STOCK TO A LATHE OR THE LIKE

(76) Inventor: Mouafak C. Albasateneh, 4961 Corso Cir., Cypress, CA (US) 90630

( * ) Notice: Subject to any disclaimer, the term of this patent is extended or adjusted under 35 U.S.C. 154(b) by 0 days.

(21) Appl. No.: 09/369,942

(22) Filed: Aug. 6, 1999

(51) Int. Cl.$^7$ ........................................................ B23Q 5/26
(52) U.S. Cl. ................................. 414/18; 82/127; 414/17
(58) Field of Search ................................ 414/14, 17, 18; 82/127

(56) References Cited

U.S. PATENT DOCUMENTS

| | | |
|---|---|---|
| 2,300,457 | 11/1942 | Mariotte . |
| 3,070,238 | 12/1962 | Holdridge . |
| 3,074,566 | 1/1963 | MacBlane, Sr. . |
| 4,034,632 | 7/1977 | Lohner . |
| 4,129,220 | 12/1978 | Peterson et al. . |
| 4,217,800 | 8/1980 | Furegati . |
| 4,221,141 | 9/1980 | Oliver . |
| 4,406,190 | 9/1983 | Mason . |
| 4,420,284 | 12/1983 | Eisinger et al. . |
| 4,423,993 | 1/1984 | Eaton . |
| 4,621,550 | 11/1986 | Berns . |
| 4,672,869 * | 6/1987 | Hasslauer et al. ...................... 82/127 |
| 4,870,880 | 10/1989 | Cantabery . |
| 4,875,396 | 10/1989 | Gathings . |
| 5,228,371 | 7/1993 | Berns . |
| 5,863,018 | 1/1999 | Allen, III et al. . |

* cited by examiner

*Primary Examiner*—Donald W. Underwood
(74) *Attorney, Agent, or Firm*—Thomas I. Rozsa; Tony D. Chen; Jerry Fong

(57) ABSTRACT

A pneumatic bar feeding apparatus for advancing a length of bar stock to a CNC center machine for processing and including a pair of concentric tubular members which are housed in a housing supported by a pair of vertical spaced apart support stands. The inner tubular member is spaced from the interior surface of the outer tubular member by at least three bearing and bushing devices which are located at three separate locations. A rear end of the inner tubular member is airtightly sealed so that air pressure does not leak out. An actuating assembly is movably installed within the inner tubular member and includes a slidable piston, a rod connected to the piston and a coil spring which surrounds the rod and biasing the rod from entering into a bar carrier which is also movably installed within the inner tubular member. The bar carrier comprises a plurality of step-down interior portions for accommodating a plurality of different size diameters of the bar stock. The inner tubular member is adapted to receive the bar stock therein such that one end of the bar stock is fitted within one of the plurality of step-down interior portions. The pneumatic bar feeding apparatus does not generate noise and vibration because the bearing and bushing devices prevent the inner tubular member from striking the interior surface of the outer tubular member and also prevent it from vibrating within the outer tubular member.

20 Claims, 3 Drawing Sheets

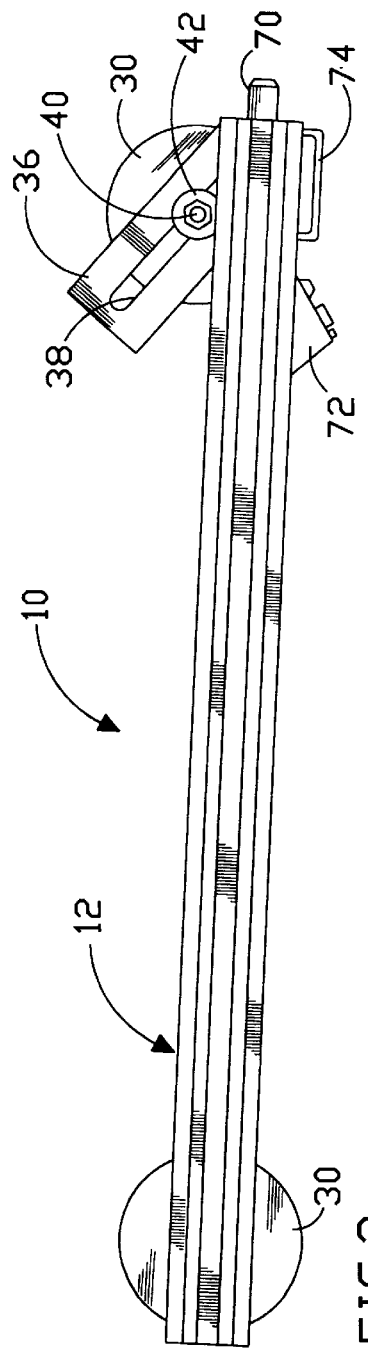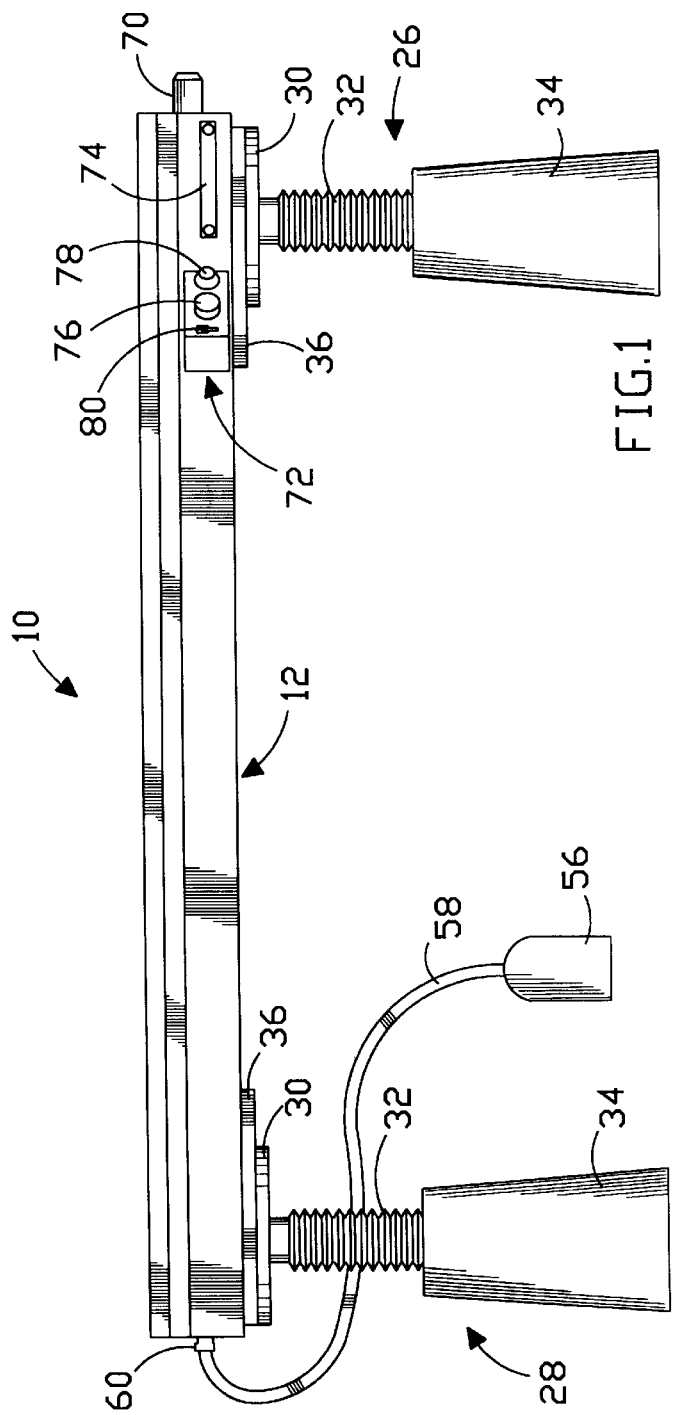

US 6,257,817 B1

PNEUMATIC BAR FEEDING APPARATUS FOR FEEDING A LENGTH OF BAR STOCK TO A LATHE OR THE LIKE

BACKGROUND OF THE INVENTION

The present invention generally relates to the field of bar feeders for feeding a length of bar stock to an automatic turning machine. More particularly, the present invention relates to the field of pneumatic bar feeding devices for feeding a length of bar stock to computer numerical control (CNC) machine centers or the like.

DESCRIPTION OF THE PRIOR ART

Specifically, prior art bar feeding devices include an elongated bar support tube for receiving a length of bar stock and a pusher feed mechanism which is movable along the interior of the support tube, to feed the bar stock to a CNC machine center or the like. The bar support tube is usually several feet in length and because the bar stock is normally required to rotate within the support tube, the use of such tubes results in problems of noise and vibration. Noise and vibration are largely caused as a result of a whipping effect which affects the rotating bar stock, causing it to contact the interior of the support tube and thereby produce a loud rattle.

Another prior art bar feeding device is a hydraulic feeding device. The hydraulic feeding device also has the same problems as the pneumatic feeding devices wherein the noise and vibration are generally caused by the whipping effect due to the bar stock striking the interior of the support tube. A further problem with hydraulic feeding device is that they require periodical maintenance to maintain the working order of the device.

Various attempts have been made to solve the noise and vibration problems and to eliminate the need for periodical maintenance, none of which has proved entirely satisfactory, either because of unacceptable complication and attendant inconvenience and expense and/or because they fail to completely solve the problem.

The following fifteen (15) prior art patents are found to be pertinent to the field of the present invention:

1. U.S. Pat. No. 2,300,457 issued to Mariotte on Nov. 3, 1942 for "Automatic Stock Bar Feed Mechanism For Automatic Screw Machines" (hereafter the "Mariotte patent");

2. U.S. Pat. No. 3,070,238 issued to Holdridge on Dec. 25, 1962 for "Automatic Bar Feed For Lathe" (hereafter the "Holdridge patent");

3. U.S. Pat. No. 3,074,566 issued to MacBlane, Sr. on Jan. 22, 1963 for "Bar Stock Feed Mechanism" (hereafter the "MacBlane patent");

4. U.S. Pat. No. 4,034,632 issued to Lohner on Jul. 12, 1977 for "Pneumatically Operated Rod Workpiece Feed Mechanism For Turning Machines" (hereafter the "Lohner patent");

5. U.S. Pat. No. 4,129,220 issued to Peterson et al. on Dec. 12, 1978 for "Bar Stock Feed Apparatus" (hereafter the "Peterson patent");

6. U.S. Pat. No. 4,217,800 issued to Furegati on Aug. 19, 1980 for "Stock-Feeding Apparatus" (hereafter the "Furegati patent");

7. U.S. Pat. No. 4,221,141 issued to Oliver on Sep. 9, 1980 for "Method And Apparatus For Feeding Bar Stock To A Machine Tool" (hereafter the "Oliver patent");

8. U.S. Pat. No. 4,406,190 issued to Mason on Sep. 27, 1983 for "Bar Stock Feed Apparatus For A Machine Tool" (hereafter the "Mason patent");

9. U.S. Pat. No. 4,420,284 issued to Eisinger et al. on Dec. 13, 1983 for "Device For The Feeding Of Material Bars For Processing Machines" (hereafter the "Eisinger patent");

10. U.S. Pat. No. 4,423,993 issued to Eaton on Jan. 3, 1984 for "Retractable Bar Stock Feeder" (hereafter the "Eaton patent");

11. U.S. Pat. No. 4,621,550 issued to Berns on Nov. 11, 1986 for "Machine For Feeding Bar Stock To A Turning Tool" (hereafter the" '550 Berns patent");

12. U.S. Pat. No. 4,870,880 issued to Cantabery on Oct. 3, 1989 for "Bar Stock Feed Mechanism For Machine Tool" (hereafter the "Cantabery patent");

13. U.S. Pat. No. 4,875,396 issued to Gathings on Oct. 24, 1989 for "Apparatus For Feeding Bar Stock To A Machine Operation" (hereafter the "Gathings patent");

14. U.S. Pat. No. 5,228,371 issued to Berns on Jul. 20, 1993 for "Bar Feeding Machine For A Lathe" (hereafter the" '371 Berns patent"); and 15. U.S. Pat. No. 5,863,018 issued to Allen, III et al. on Jan. 26, 1999 for "Bar Feeder Support" (hereafter the "Allen patent").

The Mariotte patent discloses an automatic stock bar feed mechanism for automatic screw machines. The bar feed mechanism includes a plunger movable in a tube to which a motive fluid, such as air, is supplied to actuate the plunger to feed the stock bar against the stop of the machine tool or screw machine.

The Holdridge patent discloses an automatic bar feed for lathe. The Holdridge patent eliminates the need for a feed tube of excessive length and eliminates the need for any tripod support by providing an assembly that mounts in the tube of a lathe that serves as a push-pull member for opening and closing a collet.

The MacBlane patent discloses a bar stock feed mechanism. It comprises an outer tube and an inner tube of a slightly smaller diameter which forms a cylinder in which a piston or plunger reciprocates. The end of the outer tube is closed off by a plug, where the plug receives and supports one end of the inner tube. The other end of the outer tube is provided with a sleeve which is threadedly connected to the outer tube. The sleeve has a bore therethrough to receive and support the other end of the inner tube.

The Lohner patent discloses a pneumatically operated rod workpiece feed mechanism for turning machines. It comprises a hollow feed tube which has a closed end and an open end through which the rod workpiece is adapted to be fed. An axially displaceable feed piston is arranged in the feed tube and it is movable by first fluid pressure supply means.

The Peterson patent discloses a bar stock feed apparatus. It comprises a feed tubular member adapted to receive a length of bar stock therein and a stand for supporting the feed tubular member in a feed position wherein the feed tubular member is aligned with the lathe. The feed tubular member comprises an outer tube and an inner concentric tube supported within the outer tube by front and rear end caps. A split bushing is received within the front end cap which has an opening of any one of a number of different sizes so as to be adapted for bar stock of different diameters.

The Furegati patent discloses a stock-feeding apparatus. It comprises a guide tube pivotally mounted on two spaced apart supports with the guide tube being movable between a loading position and a feeding position. Mounted within the guide tube is a fluid activated first piston for holding the end of the rod stock. Mounted within the first piston is a second piston which includes a piston rod for pushing the rod stock into the processing machine.

The Oliver patent discloses a method and apparatus for feeding bar stock to a machine tool. Stock is loaded into an elongated feed and actuating tube mounted for both axial and rotational movement. A stationary protective and support tube coaxially surrounds the rearwardly extending portion of the feed tube. The feed tube functions as a cylinder within which a short piston is mounted and is axially movable against the rear end of the bar stock by fluid pressure supplied to the rear of the feed tube.

The Mason patent discloses a bar stock feed apparatus for a machine tool. It comprises an outer tube and an inner tube disposed within the outer tube. The inner tube has a diameter such as to leave a substantial space between its own external surface and the internal surface of the outer tube to permit fluid flow through along the space. The inner tube is supported within the outer tube by annular inserts. Mounted within the inner tube is a piston which engages within one end of a pusher tube located within the inner tube.

The Eisinger patent discloses a device for feeding of material bars for processing machines. It comprises a tube wherein the rearward end of the bar is moved in the tube and in the direction of the processing machine by a piston guided in the tube and loaded by pressurizing medium. A loading bellows loaded by the pressurizing medium is located behind the piston.

The Eaton patent discloses a retractable bar stock feeder which has a pneumatic circuit with positive feed and vacuum circuits and uses an air pump to provide vacuum from a pressure line. The feeder is entirely mounted within a single base pedestal to present a readily operable control panel.

The '550 Berns patent discloses a machine for feeding a bar stock to a turning tool. It comprises a main tube and an intermediate guide tube rotatably mounted inside the main tube. The interior of the intermediate guide tube receives the workpiece. Liquid in the main tube surrounds the intermediate guide tube.

The Cantabery patent discloses a bar stock feed mechanism for a machine tool. The Cantabery patent is cited as being of interest with respect to the spacer rings spaced axially apart along the tube.

The Gathings patent discloses an apparatus for feeding bar stock to a machining operation. It comprises a first retaining sleeve positioned within the feed orifice of the machine center, and includes a master bushing having an inner diameter substantially equal to the outer diameter of the bar stock being cut. The master bushing is positioned adjacent the orifice outlet at the cutting head. A second retaining sleeve is supported exteriorly of the machine center in abutting relationship to the stock inlet of the feed orifice.

The '371 Berns patent discloses a bar feeding machine for a lathe. It comprises a filler tube for coaxial alignment with an attachment to the rotatable work receiver of the lathe, and is adapted to coaxially receive a section of bar stock for incremental feeding to the chuck of the lathe.

The Allen patent discloses a bar feeder support which has two longitudinal swivel mounts for supporting a cylindrical body for both sliding and swivel movement. The cylindrical body supports a feed tube for feeding a bar stock to a lathe.

It is desirable to provide a very efficient and also very effective design and construction of a pneumatic bar feeding apparatus that is not noisy and does not vibrate, and is maintenance free. It is also desirable to provide a pneumatic bar feeding apparatus that allows for fast production with no wasted material.

SUMMARY OF THE INVENTION

The present invention is a unique pneumatic bar feeding apparatus for advancing a length of bar stock to a CNC center machine for processing. It comprises a pair of concentric tubular members which are housed in a housing supported by a pair of vertical spaced apart support stands. The inner tubular member is spaced from the interior surface of the outer tubular member by at least three bearing and bushing devices which are located at three separate locations. A rear end of the inner tubular member is airtightly sealed so that air pressure does not leak out. An actuating assembly is movably installed within the inner tubular member and includes a slidable piston, a rod connected to the piston and a coil spring which surrounds the rod and biases the rod from entering into a bar carrier which is also movably installed within the inner tubular member. The bar carrier comprises a plurality of step-down interior portions for accommodating a plurality of different size diameters of the bar stock. The inner tubular member is adapted to receive the bar stock therein such that one end of the bar stock is fitted within one of the plurality of step-down interior portions. A mounting bracket is attached to the front end of the housing for holding the bar stock thereto.

As air pressure enters into the rear end of the inner tubular member, the air pressure pushes the slidable piston along the interior of the inner tubular member which in turn pushes the rod forward, which in turn pushes the bar carrier which retains one end of the bar stock to the CNC center machine for processing. The rod can further be pushed into the bar carrier which pushes the bar stock out from the inner tubular member so that the bar stock can be further worked on without leaving material within the bar feeding apparatus. The rod is retracted by turning off the air pressure and manually pushing the rod back into the inner tubular member so that another bar stock can be loaded.

The present invention pneumatic bar feeding apparatus does not generate noise and vibration because the bearing and bushing devices prevent the inner tubular member from striking the interior surface of the outer tubular member and also prevent it from vibrating within the outer tubular member.

The pneumatic bar feeding apparatus further includes a pivotable plate which can be pivoted to accommodate different angles of how the bar stock is fed to the CNC center machine.

It is an object of the present invention to provide a pneumatic bar feeding apparatus which does not generate noise and vibration.

It is also an additional object of the present invention to provide a pneumatic bar feeding apparatus with a bar carrier which has a plurality of step-down interior portions for accommodating a plurality of different size diameters of the bar stock to be processed.

It is an additional object of the present invention to provide a pneumatic bar feeding apparatus with an actuating assembly wherein the actuating assembly assists in pushing out the bar stock from the feeding apparatus so that no wasted material is left in the bar feeding apparatus.

It is a further object of the present invention to provide a pneumatic bar feeding apparatus which is maintenance free.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a side elevational view of the present invention pneumatic bar feeding apparatus;

FIG. 2 is a top plan view of the present invention pneumatic bar feeding apparatus;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 3:
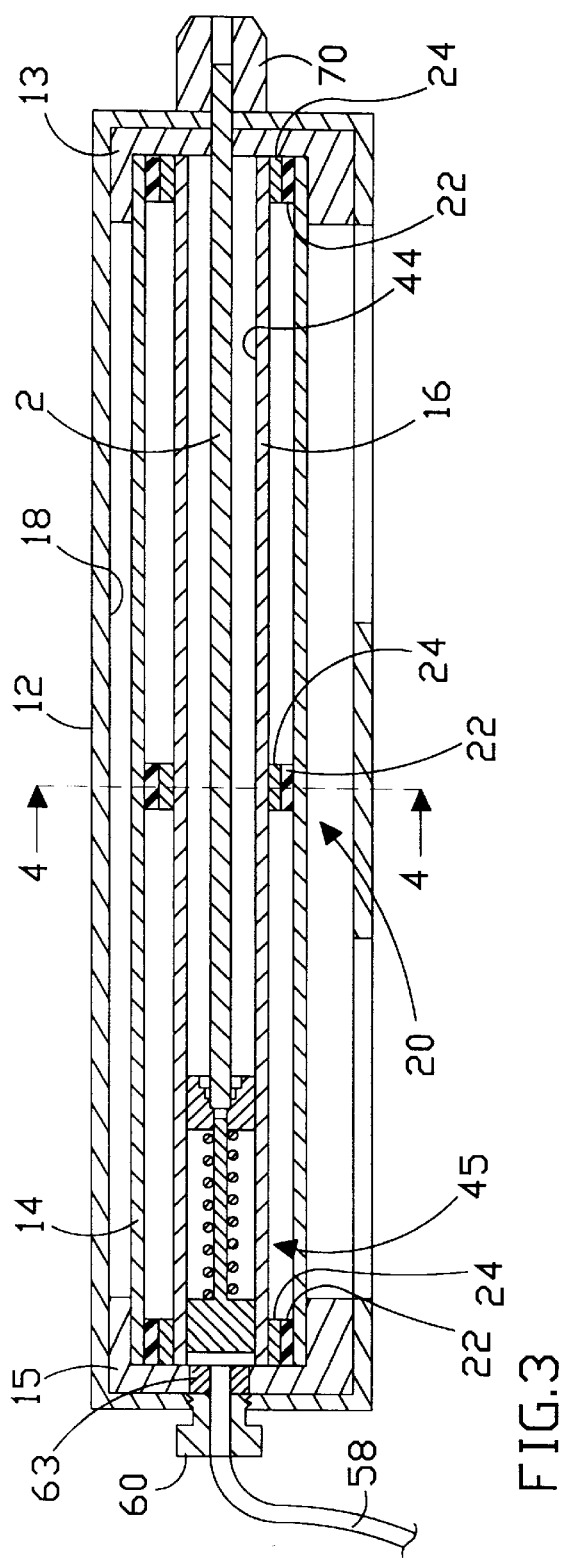
FIG. 3 is a longitudinal cross-sectional view of the present invention pneumatic bar feeding apparatus.
Figure 4:
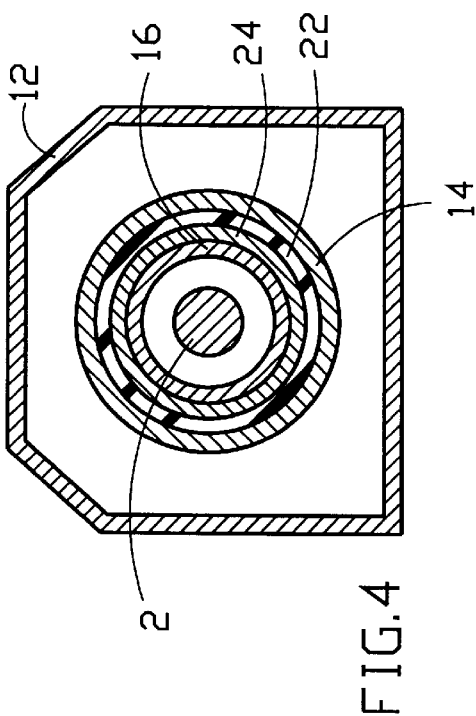
FIG. 4 is a cross-sectional view taken along line 4—4 of FIG. 3.

Referring to FIGS. 1, 2, 3 and 4, there is shown at 10 the present invention bar feeding apparatus which is used with and positioned behind a CNC center machine (not shown) for processing a length of bar stock 2. The bar feeding apparatus 10 comprises an elongated housing 12, an elongated hollow outer tubular member 14 retained within the housing 12 by two opposite retaining ends 13 and 15, and an elongated hollow inner tubular member 16 arranged within the outer tubular member 14. The inner tubular member 16 provides a restraining channel 44 for delivery of the bar stock 2, allowing for uninhibited, drag-free rotation of the bar stock 2. The inner tubular member 16 is spaced from the interior surface 18 of the outer tubular member 14 by at least three bearing and bushing devices 20 located at three locations as shown in FIG. 3. Each bearing and bushing device 20 includes a bushing 22 and a bearing 24.

By way of example, the overall length of the present invention bar feeding apparatus is approximately 6 feet or 12 feet. By way of example, a six (6) foot bar feeding apparatus may be provided with three spaced apart bearing and bushing devices while a twelve (12) foot bar feeding apparatus may be provided with six spaced apart bearing and bushing devices located along the longitudinal direction. It will be appreciated that the dimensions described above are merely one illustrative embodiment and can include many other comparable sets of dimensions.

Referring to FIGS. 1 and 2, the housing 12 is supported at remote locations by a pair of vertical spaced apart support columns 26 and 28. Each vertical support column has a generally circular shaped plate 30 for supporting the housing 12 thereon, a threaded post 32 affixed to the bottom of the plate 30 and extending downwardly to threadedly engage a stand 34. Each vertical support column further comprises a pivotable plate 36 which is pivotably mounted to the plate 30 so that the housing 12 can be pivotably moved to accommodate different angles of how the bar stock 2 is fed to the CNC center machine. The pivotable plate 36 has a central guide slot 38, where a protruding pin 40 on the top of the threaded post 32 is fitted therein and loosely secured by a nut 42 so that the pivotable plate 36 can be moved to accommodate different angles of how the bar stock 2 is fed to the CNC center machine. The housing 12 is pivotably slid such that the inner tubular member 14 is moved into an inoperative position for feeding the bar stock 2 to the CNC center machine and in an inoperative position wherein another bar stock can be loaded into the inner tubular member 14 for processing.

Figure 5:
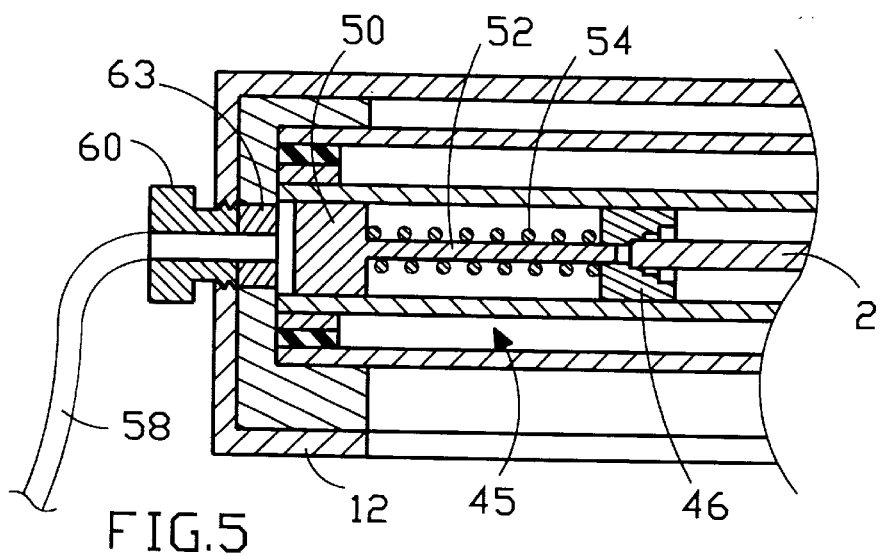
FIG. 5 is a partial enlarged cross-sectional view of the rear section of the present invention pneumatic bar feeding apparatus.
Figure 6:
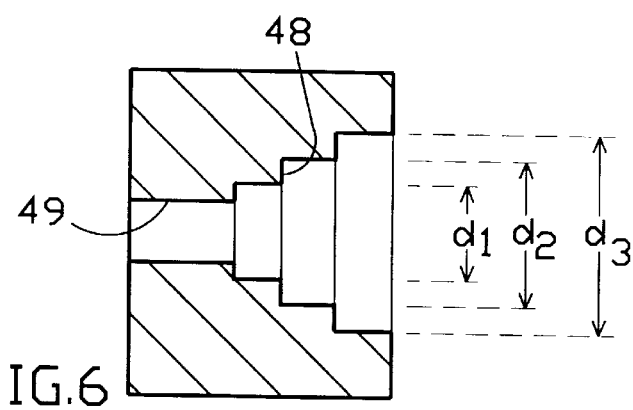
FIG. 6 a cross-sectional view of a bar carrier of the present invention pneumatic bar feeding apparatus.

Referring to FIGS. 3, 5 and 6, there is provided a cylindrical shaped slidable bar carrier 46 which is disposed within the inner tubular member 16 for receiving one end of the bar stock 2. The bar carrier 46 has an outer diameter which is slightly smaller than the interior diameter of the inner tubular member 16 for allowing the bar carrier 46 to slide uninhibited and drag-free within the inner tubular member 16. The bar carrier 46 includes a plurality of step-down interior portions 48 for accommodating a plurality of different size diameters of the bar stock 2 and a central opening 49 which extends through to the plurality of step-down interior portions 48. The step-down portions 48 include a plurality of diameters $d_1$, $d_2$ and $d_3$ for accommodating different size diameters of the bar stock 2, where $d_1$, $d_2$ and $d_3$ are approximately ⅜, ⅝ and ¾ respectively. It will be appreciated that the diameters described above are merely one illustrative embodiment and can include many other comparable sets of diameters.

Referring to FIGS. 3 and 5, there is shown an actuating assembly 45 which is disposed within the inner tubular member 16 and located behind the bar carrier 46 for longitudinal movement. The actuating assembly 45 comprises a slidable piston 50, an elongated rod 52 permanently affixed to one end of the piston 50 and a coil spring 54 disposed around the rod 52. The front end of the rod 52 abuts against the rear of the bar carrier 46, where the coil spring 54 biases the rod 52 from entering into the central opening 49 of the bar carrier 46 and engaging with the bar stock 2 before the bar carrier 46 has reached retaining end 13 of the housing 12.

Referring to FIGS. 1, 3 and 5, there is provided a pneumatic pressure source 56 for providing fluid pressure into the inner tubular member 16. The pressure source 56 is connected to a hose line 58 which is connected to a threaded plug 60 or other suitable means, which is airtightly sealed to the housing 12 so that air pressure does not leak out. The hose line 58 is further attached to a bearing 63 in the housing 12 for allowing the hose line 58 to pivot.

Figure 7:
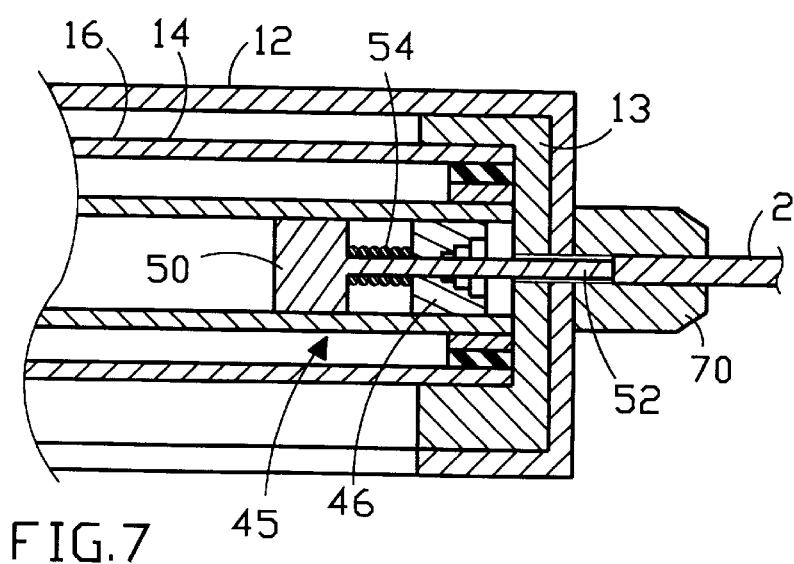
FIG. 7 is a partial enlarged cross-sectional view of the front section of the present invention pneumatic bar feeding apparatus.

Referring to FIGS. 5 and 7, as air pressure is supplied through the hose line 58 to cause advance of the piston 50 which in turn causes the rod 52 to move forward, the rod 52 pushes the bar carrier 46 forward which advances the bar stock 2 to the CNC center machine for processing. Air under pressure is supplied through the hose line 58 to cause advance of the bar stock 2 as required, and a mounting bracket 70 (not shown in detail) is tightened to hold the bar stock 2. When CNC center machine operations have been completed on a first portion of the bar stock 2, the mounting bracket 70 can be released and further pressure through the hose line 58 causes advance of a new portion of the bar stock 2 into position for holding by the mounting bracket 70. Then the mounting bracket 70 is again tightened, and the operation is repeated. When a last portion of the bar stock 2 is advanced into the mounting bracket 70, the rod 52 can further push out the bar stock 2 from the inner tubular member because of the coil spring 54 so that the bar stock 2 can be further worked on, where the rod 52 enters into the central opening 49 of the bar carrier 46 and engages with the bar stock 2 to further advance the bar stock 2 to be processed so that no material of the bar stock 2 is left within the inner tubular member 16 (see FIG. 7).

No noise and vibration are generated because the bearing and bushing devices prevent the inner tubular member 16 from hitting the interior wall of the outer tubular member 14 and also prevent it from vibrating within the outer tubular member 14. The actuating assembly 46 is retracted by turning off the air pressure and manually pushing the actuating assembly 46 within the inner tubular member 16.

Referring to FIG. 1, there is provided control means 72 which is mounted on the side of the housing 12 for controlling the operation of the bar feeding apparatus 10. The control means 72 may include a handle 74, pressure gauge 76, regulator knob 78 and an ON/OFF switch 80, and are mounted on the side of the housing 12 which faces the machine tool operator.

Defined in detail, the present invention is a bar feeding apparatus comprising: (a) an elongated hollow outer tubular member; (b) an elongated hollow inner tubular member adapted to receive a length of bar stock therein, the inner tubular member disposed within the outer tubular member and spaced from an interior surface of the outer tubular member by three spaced apart bearing and bushing members located at three separate locations for permitting the inner tubular member to rotate when the bar stock is rotating and preventing noise and vibration; (c) an elongated hollow housing for housing the inner and outer tubular members; (d) a pair of spaced apart support stands for supporting the housing such that the inner tubular member is in an operative position for feeding the bar stock to a processing machine and in an inoperative position wherein the bar stock can be loaded into the inner tubular member; (e) a cylindrical shaped slidable bar carrier for receiving one end of the bar stock and disposed within the inner tubular member, the bar carrier having an outer diameter which is slightly smaller than an interior diameter of the inner tubular member, a plurality of step-down interior portions for accommodating a plurality of different size diameters of the bar stock, and a central opening extending through to the plurality of step-down interior portions; (f) an actuating assembly including a slidable piston, an elongated rod connected to the piston and a coil spring surrounding the rod, the actuating assembly disposed within the inner tubular member and located behind the bar carrier for longitudinal movement therein, where the rod is aligned with the central opening of the bar carrier and the coil spring is biasing the rod from engaging with the bar stock before the bar carrier reaches a front end of the inner tubular member; and (g) a pneumatic pressure source interconnected to the inner tubular member and behind the actuating assembly to thereby cause the piston and the rod to advance longitudinally within the inner tubular member which in turn pushes the bar carrier, which in turn pushes the bar stock to the processing machine for processing, where the rod can further enter into the central opening of the bar carrier to engage the one end of the bar stock to further advance the bar stock to the processing machine so that no material of the bar stock is left within the inner tubular member; (h) whereby the bar feeding apparatus prevents vibrations and noise from generating when the bar feeding apparatus is in operation.

Defined broadly, the present invention is a bar feeding apparatus comprising: (a) an elongated hollow outer tubular member; (b) an elongated hollow inner tubular member adapted to receive a length of bar stock therein, the inner tubular member disposed within the outer tubular member and spaced from an interior surface of the outer tubular member by a plurality of spaced apart bearing and bushing members for permitting the inner tubular member to rotate when the bar stock is rotating and preventing noise and vibration; (c) an elongated hollow housing for housing the inner and outer tubular members; (d) a slidable bar carrier disposed within the inner tubular member for receiving one end of the bar stock and having a plurality of step-down interior portions for accommodating a plurality of different size diameters of the bar stock and a central opening extending through to the plurality of step-down interior portions; (e) an actuating assembly including a slidable piston, an elongated rod connected to the piston and biasing means for biasing the rod, the actuating assembly disposed within the inner tubular member and located behind the bar carrier for longitudinal movement therein, where the rod is aligned with the central opening of the bar carrier and the biasing means biasing the rod from engaging with the bar stock before the bar carrier reaches a front end of the inner tubular member; and (f) means for supplying fluid under pressure within the inner tubular member and thereby cause the piston and the rod to advance longitudinally within the inner tubular member which in turn pushes the bar carrier, which in turn pushes the bar stock to a processing machine for processing, where the rod can further enter into the opening of the bar carrier to engage the one end of the bar stock to further advance the bar stock to the processing machine so that no material of the bar stock is left within the inner tubular member; (g) whereby the bar feeding apparatus prevents vibrations and noise from generating when the bar feeding apparatus is in operation.

Defined more broadly, the present invention is a bar feeding apparatus comprising: (a) an outer tubular member; (b) an inner tubular member adapted to receive a length of bar stock therein, the inner tubular member disposed within the outer tubular member and spaced from an interior surface of the outer tubular member by at least three bearing and bushing members for permitting the inner tubular member to rotate when the bar stock is rotating and preventing noise and vibration; (c) a slidable bar carrier disposed within the inner tubular member for receiving one end of the bar stock and having a plurality of step-down interior portions for accommodating a plurality of different size diameters of the bar stock and an opening extending through to the plurality of step-down interior portions; (d) an actuating assembly including a slidable piston, a rod connected to the piston and means for biasing the rod, the actuating assembly disposed within the inner tubular member for longitudinal movement therein, where the rod is aligned with the opening of the bar carrier and the biasing mean biasing the rod from engaging with the bar stock before the bar carrier reaches a front end of the inner tubular member; and (e) means for supplying fluid under pressure within the inner tubular member and thereby cause the piston and the rod to advance longitudinally within the inner tubular member which in turn pushes the bar carrier, which in turn pushes the bar stock to a processing machine for processing, where the rod can further enter into the opening of the bar carrier to engage one end of the bar stock to further advance the bar stock to the processing machine so that no material of the bar stock is left within the inner tubular member; (f) whereby the bar feeding apparatus prevents vibrations and noise from generating when the bar feeding apparatus is in operation.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A bar feeding apparatus comprising:
   a. an elongated hollow outer tubular member;
   b. an elongated hollow inner tubular member adapted to receive a length of bar stock therein, the inner tubular member disposed within said outer tubular member and spaced from an interior surface of said outer tubular member by three spaced apart bearing and bushing members located at three separate locations for permitting the inner tubular member to rotate when the bar stock is rotating and preventing noise and vibration;
   c. an elongated hollow housing for housing said inner and outer tubular members;
   d. a pair of spaced apart support stands for supporting said housing such that said inner tubular member is in an operative position for feeding the bar stock to a processing machine and in an inoperative position wherein the bar stock can be loaded into said inner tubular member;
   e. a cylindrical shaped slidable bar carrier for receiving one end of said bar stock and disposed within said inner tubular member, the bar carrier having an outer diameter which is slightly smaller than an interior diameter of said inner tubular member, a plurality of step-down interior portions for accommodating a plurality of different size diameters of the bar stock, and a central opening extending through to the plurality of step-down interior portions;
   f. an actuating assembly including a slidable piston, an elongated rod connected to the piston and a coil spring surrounding the rod, the actuating assembly disposed within said inner tubular member and located behind said bar carrier for longitudinal movement therein, where the rod is aligned with said central opening of said bar carrier and the coil spring is biasing the rod from engaging with said bar stock before said bar carrier reaches a front end of said inner tubular member; and
   g. a pneumatic pressure source interconnected to said inner tubular member and behind said actuating assembly to thereby cause said piston and said rod to advance longitudinally within said inner tubular member which in turn pushes said bar carrier, which in turn pushes the bar stock to the processing machine for processing, where said rod can further enter into said central opening of said bar carrier to engage the one end of the bar stock to further advance the bar stock to the processing machine so that no material of the bar stock is left within said inner tubular member;
   h. whereby said bar feeding apparatus prevents vibrations and noise from generating when said bar feeding apparatus is in operation.

2. The bar feeding apparatus in accordance with claim 1, further comprising a mounting bracket mounted to one end of said housing for retaining one end of the bar stock thereto.

3. The bar feeding apparatus in accordance with claim 1, wherein said each support stand comprises a pivotable plate which can be pivoted to accommodate different angles of how the bar stock is fed to the processing machine.

4. The bar feeding apparatus in accordance with claim 1, further comprising control means for controlling the operation of said bar feeding apparatus.

5. The bar feeding apparatus in accordance with claim 4, wherein said control means further comprises a pressure gauge, a regulator knob and an ON/OFF switch.

6. A bar feeding apparatus comprising:
   a. an elongated hollow outer tubular member;
   b. an elongated hollow inner tubular member adapted to receive a length of bar stock therein, the inner tubular member disposed within said outer tubular member and spaced from an interior surface of said outer tubular member by a plurality of spaced apart bearing and bushing members for permitting the inner tubular member to rotate when the bar stock is rotating and preventing noise and vibration;
   c. an elongated hollow housing for housing said inner and outer tubular members;
   d. a slidable bar carrier disposed within said inner tubular member for receiving one end of the bar stock and having a plurality of step-down interior portions for accommodating a plurality of different size diameters of the bar stock and a central opening extending through to the plurality of step-down interior portions;
   e. an actuating assembly including a slidable piston, an elongated rod connected to the piston and biasing means for biasing the rod, the actuating assembly disposed within said inner tubular member and located behind said bar carrier for longitudinal movement therein, where the rod is aligned with said central opening of said bar carrier and the biasing means biasing the rod from engaging with said bar stock before said bar carrier reaches a front end of said inner tubular member; and
   f. means for supplying fluid under pressure within said inner tubular member and thereby cause said piston and said rod to advance longitudinally within said inner tubular member which in turn pushes said bar carrier, which in turn pushes the bar stock to a processing machine for processing, where said rod can further enter into said opening of said bar carrier to engage the one end of the bar stock to further advance the bar stock to the processing machine so that no material of the bar stock is left within said inner tubular member;
   g. whereby said bar feeding apparatus prevents vibrations and noise from generating when said bar feeding apparatus is in operation.

7. The bar feeding apparatus in accordance with claim 6, further comprising a pair of spaced apart support stands for supporting said housing such that said inner tubular member is in an operative position for feeding the bar stock to a processing machine and in an inoperative position wherein the bar stock can be loaded into said inner tubular member.

8. The bar feeding apparatus in accordance with claim 7, wherein said each support stand comprises a pivotable plate which can be pivoted to accommodate different angles of how the bar stock is fed to the processing machine.

9. The bar feeding apparatus in accordance with claim 6, further comprising a mounting bracket mounted to one end of said housing for retaining one end of the bar stock thereto.

10. The bar feeding apparatus in accordance with claim 9, further comprising control means for controlling the operation of said bar feeding apparatus.

11. The bar feeding apparatus in accordance with claim 10, wherein said control means further comprises a pressure gauge, a regulator knob and an ON/OFF switch.

12. The bar feeding apparatus in accordance with claim 6, wherein said means for supplying fluid under pressure includes a pneumatic pressure source.

13. A bar feeding apparatus comprising:

a. an outer tubular member;

b. an inner tubular member adapted to receive a length of bar stock therein, the inner tubular member disposed within said outer tubular member and spaced from an interior surface of said outer tubular member by at least three bearing and bushing members for permitting the inner tubular member to rotate when the bar stock is rotating and preventing noise and vibration;

c. a slidable bar carrier disposed within said inner tubular member for receiving one end of the bar stock and having a plurality of step-down interior portions for accommodating a plurality of different size diameters of the bar stock and an opening extending through to the plurality of step-down interior portions;

d. an actuating assembly including a slidable piston, a rod connected to the piston and means for biasing the rod, the actuating assembly disposed within said inner tubular member for longitudinal movement therein, where the rod is aligned with said opening of said bar carrier and said biasing mean biasing the rod from engaging with said bar stock before said bar carrier reaches a front end of said inner tubular member; and e. means for supplying fluid under pressure within said inner tubular member and thereby cause said piston and said rod to advance longitudinally within said inner tubular member which in turn pushes said bar carrier, which in turn pushes the bar stock to a processing machine for processing, where said rod can further enter into said opening of said bar carrier to engage the one end of the bar stock to further advance the bar stock to the processing machine so that no material of the bar stock is left within said inner tubular member;

f. whereby said bar feeding apparatus prevents vibrations and noise from generating when said bar feeding apparatus is in operation.

14. The bar feeding apparatus in accordance with claim 13, further comprising an elongated hollow housing for housing said inner and outer tubular members.

15. The bar feeding apparatus in accordance with claim 14, further comprising a mounting bracket mounted to one end of said housing for retaining one end of the bar stock thereto.

16. The bar feeding apparatus in accordance with claim 14, further comprising a pair of spaced apart support stands for supporting said housing such that said inner tubular member is in an operative position for feeding the bar stock to the processing machine and in an inoperative position wherein the bar stock can be loaded into said inner tubular member.

17. The bar feeding apparatus in accordance with claim 16, wherein said each support stand comprises a pivotable plate which can be pivoted to accommodate different angles of how the bar stock is fed to the processing machine.

18. The bar feeding apparatus in accordance with claim 13, further comprising control means for controlling the operation of said bar feeding apparatus.

19. The bar feeding apparatus in accordance with claim 18, wherein said control means further comprises a pressure gauge, a regulator knob and an ON/OFF switch.

20. The bar feeding apparatus in accordance with claim 19, wherein said means for supplying fluid under pressure includes a pneumatic pressure source.

* * * * *